US 7,167,252 B2
(12) United States Patent
Gallup (10) Patent No.: US 7,167,252 B2
(45) Date of Patent: Jan. 23, 2007

(54) METHOD AND APPARATUS FOR CREATING CAVITIES IN PACKAGING MATERIALS FOR ARTIFACTS, ART OBJECTS AND FRAGILE OR OTHER VALUABLE ITEMS

(75) Inventor: Kevin Gallup, 915 W. Ocean View Ave., Norfolk, VA (US) 23503

(73) Assignee: Kevin Gallup, Pensacola, FL (US)

( * ) Notice: Subject to any disclaimer, the term of this patent is extended or adjusted under 35 U.S.C. 154(b) by 135 days.

(21) Appl. No.: 10/996,112

(22) Filed: Nov. 23, 2004

(65) Prior Publication Data
US 2006/0109481 A1    May 25, 2006

(51) Int. Cl.
*G01B 11/24* (2006.01)
*B65D 81/02* (2006.01)

(52) U.S. Cl. ............. 356/602; 356/601; 356/627; 356/638; 356/606; 356/607; 206/592

(58) Field of Classification Search ........ 356/601–604, 356/606–608, 611, 612, 623, 3.01, 3.1, 3.11, 356/3.14; 382/106, 154; 206/592; 53/456; 702/159; 345/419; 409/80
See application file for complete search history.

(56) References Cited

U.S. PATENT DOCUMENTS

| | | | |
|---|---|---|---|
| 3,187,185 A | | 6/1965 | Milnes |
| 4,705,401 A | | 11/1987 | Addleman et al. |
| 5,024,328 A | | 6/1991 | Bontrager |
| 5,073,005 A | * | 12/1991 | Hubbs ........................ 359/515 |
| 5,160,473 A | | 11/1992 | Bontrager |
| 5,202,168 A | * | 4/1993 | Turner et al. .............. 428/41.8 |
| 5,347,900 A | | 9/1994 | Caeser et al. |
| 5,513,613 A | | 5/1996 | Taylor et al. |
| 5,519,204 A | * | 5/1996 | Rudd et al. ................. 250/205 |
| 5,543,103 A | * | 8/1996 | Hogan et al. .............. 264/219 |
| 5,544,291 A | | 8/1996 | Gilley et al. |
| 5,598,685 A | | 2/1997 | Graham et al. |
| 5,745,666 A | | 4/1998 | Gilley et al. |
| 5,747,822 A | | 5/1998 | Sinclair et al. |
| 5,779,055 A | | 7/1998 | Lacy, III |
| 5,864,640 A | | 1/1999 | Miramonti et al. |
| 5,988,862 A | | 11/1999 | Kacyra et al. |
| 6,094,269 A | | 7/2000 | Ben-Dove et al. |
| 6,205,243 B1 | * | 3/2001 | Migdal et al. .............. 382/154 |
| 6,246,468 B1 | | 6/2001 | Dimsdale et al. |
| 6,330,523 B1 | | 12/2001 | Kacyra et al. |
| 6,406,227 B1 | * | 6/2002 | Titus et al. .................... 409/81 |
| 6,473,079 B1 | | 10/2002 | Dimsdale et al. |
| 6,512,518 B1 | | 1/2003 | Dimsdale et al. |
| 6,542,249 B1 | | 4/2003 | Kofman et al. |
| 6,549,288 B1 | | 4/2003 | Migdal et al. |

(Continued)

OTHER PUBLICATIONS

International Search Report from PCT/US2005/041710 mailed Apr. 6, 2006.

*Primary Examiner*—Layla G. Lauchman
*Assistant Examiner*—David H. Parker (57) ABSTRACT

A non-contact surface measurement system, method and apparatus provides data to computers so that the topography of the surface of an object can be digitally recreated. 3-D images that define tool paths can be created from the data. Thus, cavities may be formed in selected materials by a tool. The appropriately selected materials safely encapsulate the object, which may be an artifact, art object, or other fragile or valuable item for moving or storage.

48 Claims, 4 Drawing Sheets

U.S. PATENT DOCUMENTS

| | | |
|---|---|---|
| 6,734,849 B1 | 5/2004 | Dimsdale et al. |
| 6,771,840 B1 | 8/2004 | Ioannou et al. |
| 6,781,683 B1 | 8/2004 | Kacyra et al. |
| 6,804,380 B1 | 10/2004 | Ioannou et al. |
| 7,050,930 B1* | 5/2006 | Raab et al. ................. 702/152 |
| 2003/0065689 A1 | 4/2003 | Asai et al. |
| 2003/0117411 A1 | 6/2003 | Fujiwara et al. |
| 2003/0127185 A1* | 7/2003 | Bakly ........................ 156/297 |
| 2004/0051711 A1* | 3/2004 | Dimsdale et al. ........... 345/419 |
| 2004/0263863 A1* | 12/2004 | Rogers et al. .............. 356/602 |

* cited by examiner

METHOD AND APPARATUS FOR CREATING CAVITIES IN PACKAGING MATERIALS FOR ARTIFACTS, ART OBJECTS AND FRAGILE OR OTHER VALUABLE ITEMS

BACKGROUND OF THE INVENTION

Surface measurement apparatuses have been limited in use with artifacts and valuable art subjects because of methods that require physical contact. Most curators of art objects will not allow laser beams to contact surfaces, whether for topographical measurement (beamed or pulsed) or any other purpose.

Current optical measurement apparatuses may involve shadowing of the light beam or obstruction of the sensor's view due to features associated with the surface of the object to be measured and eventually packaged. Additionally, present systems require operators skilled in the art of computer aided design (CAD) to manually recreate surfaces that appear as shadows, gaps, or voids due to the non-reflectivity of transparent objects such as glass items.

Further, present systems for measuring and packaging precious objects provide "overlaps" created by moving the object or the measurement system in an arc around the object. Movement of either the object or system creates several planes around the object. This multiplicity of planes requires additional significant time by the CAD operator to define a single plane in order to create the proper tool path for a two part enclosure.

Also, present measuring systems possess single or dual laser measurement devices to create the measurement points. Single and dual laser systems require focusing on all aspects of the object or the object must be rotated in order to allow for providing adequate measurements around all necessary convex surfaces.

U.S. Pat. Nos. 5,544,921 and 5,745,666 to Gilley, et. al, describes a computer implemented method of displaying a three-dimensional model having one or more surfaces and mapping an array of grid points and applying a contouring function to the array.

U.S. Pat. No. 5,988,862 to Kacyra, et. al, describes an apparatus for imaging and modeling three dimensional objects using an imaging module for emitting a laser beam for scanning the surface of a remote object and recording data points corresponding to the points on the surface of the object.

U.S. Pat. No. 6,330,523 to Kacyra, et. al, describes a pulsed laser beam and a means for generating a point cloud based upon the measured time delays and angle measurements with the point cloud being a plurality of data points that each represents a location of a corresponding point on the surface.

U.S. Pat. No. 6,734,849 to Dimsdale, et. al, describes a method for fitting a point cloud representing a corner using fitting algorithms to determine the three planes of the corner.

U.S. Pat. No. 6,246,468 to Dimsdale, et. al, describes a laser calibration system where a single optical fiber of known length is used to determine the time it takes for a laser beam to be emitted and detected from a reflected surface at a known distance and comparatively analyzed against the known length to determine an adjusted length translating into a distance measurement.

U.S. Patent Application 20030117411A1 to Fujiwara, et. al., describes a texture mapping method that utilizes calculating a mapping value by means of a weighted average to fill gaps and voids in the point cloud obtained when scanning a surface of an object. Gaps and voids are systematically detected and point clouds are mathematically created to anticipate the representative topography of the object.

U.S. Patent Application 20040051720A1 to Hall, et. al., describes a method for a customer to measure and define an objects topography and provide computer data to an offsite location. The data is then manipulated into providing a cutting file for a computer numerical control robotic tool that provides manufacturing capability for a generic model of the customer's product.

PCT Patent Application WO04044689A3 to Yau, et. al., describes a mathematical method for recognizing and analyzing a geometric surface and calculating conforming corresponding surfaces using recognized geometric shapes.

Chinese Patent Number 86102666A to Wang, Yanying, describes a three step process using digital mapping, autotracking and autocutting to manufacture reproductions of original pieces of art without the necessity of artists.

U.S. Pat. No. 5,024,328 to Bontrager, Rick, describes a hinged blank formed to act as a cushion to protect a fragile part for shipping comprising a block of material shaped to conform to the shape of the part. The cutout foam is linear and comprises V features that allow it to be folded and conform to various size objects.

U.S. Pat. No. 5,160,473 to Bontrager, Rick, describes a method of forming a single piece of polyurethane foam packing from a blank by using a cutting die. This is a divisional patent of U.S. Pat. No. 5,160,473.

European Patent Number 0477620A3 to Williams, Earnest, describes a protector for protecting or supporting fragile articles produced by cutting from resilient material, in slab or sheet form, the members being interfitted so as to extend around the article or articles. The protector includes members which, when assembled together, conform interiorly in part at least to the surface profile of the article or articles to be protected.

U.S. Pat. No. 5,779,055 to Lacy III, describes a package for delicate items having a hinged base with a cavity with base side flanges that surround the item and are hinged to each other and a cover engageable with the base.

U.S. Pat. No. 5,347,900 to Ceaser, et. al., describes a bore making apparatus to form blocks of foam using resistive heating elements to cut the material. Each forming member is set to a cross sectional shape and aligned in an array.

U.S. Pat. No. 5,598,685 to Graham, et. al., describes a process for making containers for fragile items and automatically inserting items into the containers. It pertains to a cardboard box shaping machine.

U.S. Pat. No. 6,473,079 to Dimsdale, et. al., describes a method of measuring an object by segmenting the field of scanned points into scalar values and then converting the scalar values into binary data and applying recursive techniques to create an image. This application is a division of U.S. Pat. No. 5,988,862.

U.S. Pat. No. 6,512,518 to Dimsdale, et. al., describes a continuation of U.S. Pat. No. 6,473,079 wherein an area of a computer generated image may be chosen and selectively refined as to create a preferred image. This application is a division of U.S. Pat. No. 5,988,862.

U.S. Pat. Nos. 6,771,840 and 6,804,380 to Ioannou, et. al., describes an apparatus for defining a first set of seed points used to display a feature and subsequent seed points to further use in triangulation in order to create measurements and three dimensional images. Further definition includes a computer for identifying and generating points and determining a tie-point target for generating an image.

U.S. Patent Application 20030065689A1 to Asai, et. al., describes a method for creating images using a Riemannian manifold to perform an approximation of where the points would be and constructing an image based on these points.

U.S. Pat. No. 6,781,683 to Kacyra, et. al., describes a method for operating a laser scanner, scanning to create a field survey which has a number of scan points identifying the corresponding points of interest. This application is a division of U.S. Pat. No. 6,619,406, U.S. Pat. No. 5,864,640 to Miramonti, et. al., describes a digital scanner with a color detector responsive to a broad band of visible light. It is operated through a computer and selective points are interrogated on an object, colors analyzed and a 3D image is generated.

U.S. Pat. No. 5,747,822 to Sinclair, et. al., describes an apparatus for digitizing an object and creating a 3D image using planar sheets of light and analyzing the angles created to define contours of the object.

U.S. Pat. No. 4,705,401 to Addleman, et. al., describes an apparatus for illuminating a surface, moving the surface in relation to a scanning device, determining the position of the points along the surface and computer generating a contoured image of the surface.

U.S. Pat. No. 6,549,288 to Migdal, et. al., describes a system that generates a light stripe on an object and intersecting points on the contour are measured via triangulation to create a representative 3-D computer generated image.

U.S. Pat. No. 6,542,249 to Kofman, et. al., describes a method of obtaining 3-D data from an object by overlapping views and providing computational information to provide for transformations into a common reference frame.

SUMMARY OF INVENTION

In one aspect of one or more embodiments of the present invention is to provide a non-contact texture mapping system readable by a computer for defining a plurality of texture images where mapping positions are determined that allow for mapping the texture images onto the surface of a three-dimensional object.

A texture mapping system in accordance with one or more embodiments of the present invention comprises three laser measurement devices so that the central laser measurement device is equidistant from the outer two laser measurement devices. The outer two laser measurement devices are positioned such that they are on the same plane such that the outer laser measurement devices (left and right) are angled towards the central laser measurement device so that when they are operational the outer beams intersect the central beam at a selected point. This positioning helps determine the focal length of the laser measurement module array and is selected by the user of the system. The three laser measurement modules provide minimally two points for measurement around curvatures and textures of the objects without any need for turning or moving the object or measurement system.

In one aspect of one or more embodiments of the invention, a device and method for creating virtual surfaces where shadow, gaps, and/or voids appear due to objects that have voids themselves or are transparent is provided. Advantageously, the need for those skilled in the art of computer aided design (CAD) are required to manually manipulate the data in order to create surfaces that otherwise do not appear to exist with present measuring device equipment is reduced or eliminated.

A device in accordance with one or more embodiments of the present invention also provides a surface for the system to measure against in proximity of where the gap, void, or shadow exists, thereby quickly creating a virtual surface.

In one aspect of one or more embodiments of the present invention a method defines a virtual single plane through the object being measured. This single plane defines the parting line of the cavity portions that will be created for the object. This plane is defined during calibration of the laser measurement module array whereby the measurement system, when moved longitudinally along the system X-axis, defines focal points that are equidistant from the X-axis of the measurement system.

These points define both the measurement focal length and the cavity plane. The object to be measured and eventually packaged is then properly positioned by the user so that the cavity plane defines two portions (a front and rear) of the object. The cavity plane is user definable at the site and takes into account the inner dimensions of the shipping or storage container which define the outer dimensions of the cavity portions.

In one aspect of one or more embodiments of the present invention the system is portable and the system may be used in rooms or spaces of varying sizes and with objects of varying dimensions.

In one aspect of one or more embodiments of the present invention a system and method for capturing measurement data from the object and storing it on portable memory devices for transmittal off-site for manipulation utilizing computer aided manufacturing (CAM) processes for creation of the cavity portions is provided.

In one or more embodiments of the present invention, a system for obtaining non-contact surface measurement data pertaining to the topography of the surface of artifacts and valuable art objects is provided. The device and methods provide data to digital computers so that the topography of the surface can be digitally stored, recreated, transmitted to an appropriate CAD software program such as Soildworks® and tool paths can be created from the data so that cavities may be formed to safely encapsulate artifacts, fragile items, and other valuables for moving or storing.

DETAILED DESCRIPTION OF THE INVENTION

Embodiments of the invention relate to a method and apparatus for automated measurement of three-dimensional surfaces. The surface is sensed and determined via a non-contact optical triangulation means and the optically produced image is measured by electronic means the signals of which are transmitted to a digital computer.

The electronic measurements are sent to a digital computer for storage, analysis and other functions. Embodiments of the invention allow for a significant reduction of time (i.e. increase of speed) and for alleviation of shadowing, gaps, and voids from surface irregularities when making automated measurements. These quick and relatively precise measurements eventually allow for manufacture of cavities and subsequent packaging, normally within several hours. Heretofore, the measurement techniques and subsequent packaging often requires days or even weeks to provide suitable cavities for artifacts and objects of art with an associated high value. Laser light response is transmitted to electronic circuits to detect and measure points on the line and transfer the data to a digital computer.

Figure 1:
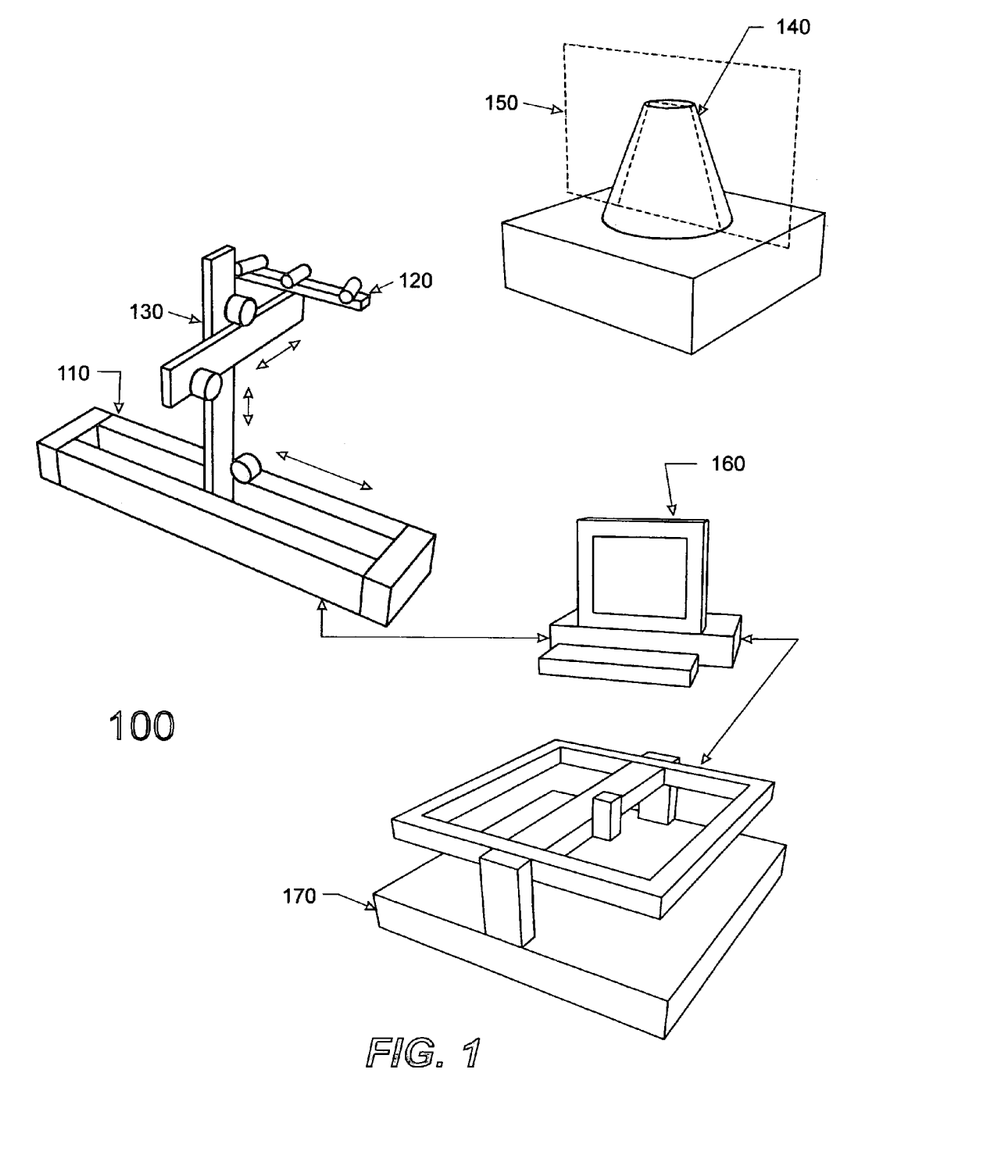
FIG. 1 illustrates components of a system in accordance with one or more embodiments of the present invention.

FIG. 1 illustrates a measurement system [100] in accordance with one or more embodiments of the present invention. As shown in FIG. 1, the measurement system [100] includes a measurement module [110] laser measurement device assembly [120], a three-coordinate (x, y, z) axis system [130], an object [140] being measured, a virtual plane that defines two mating surfaces [150], a computer system [160], and a numerical tool [170].

Figure 2:
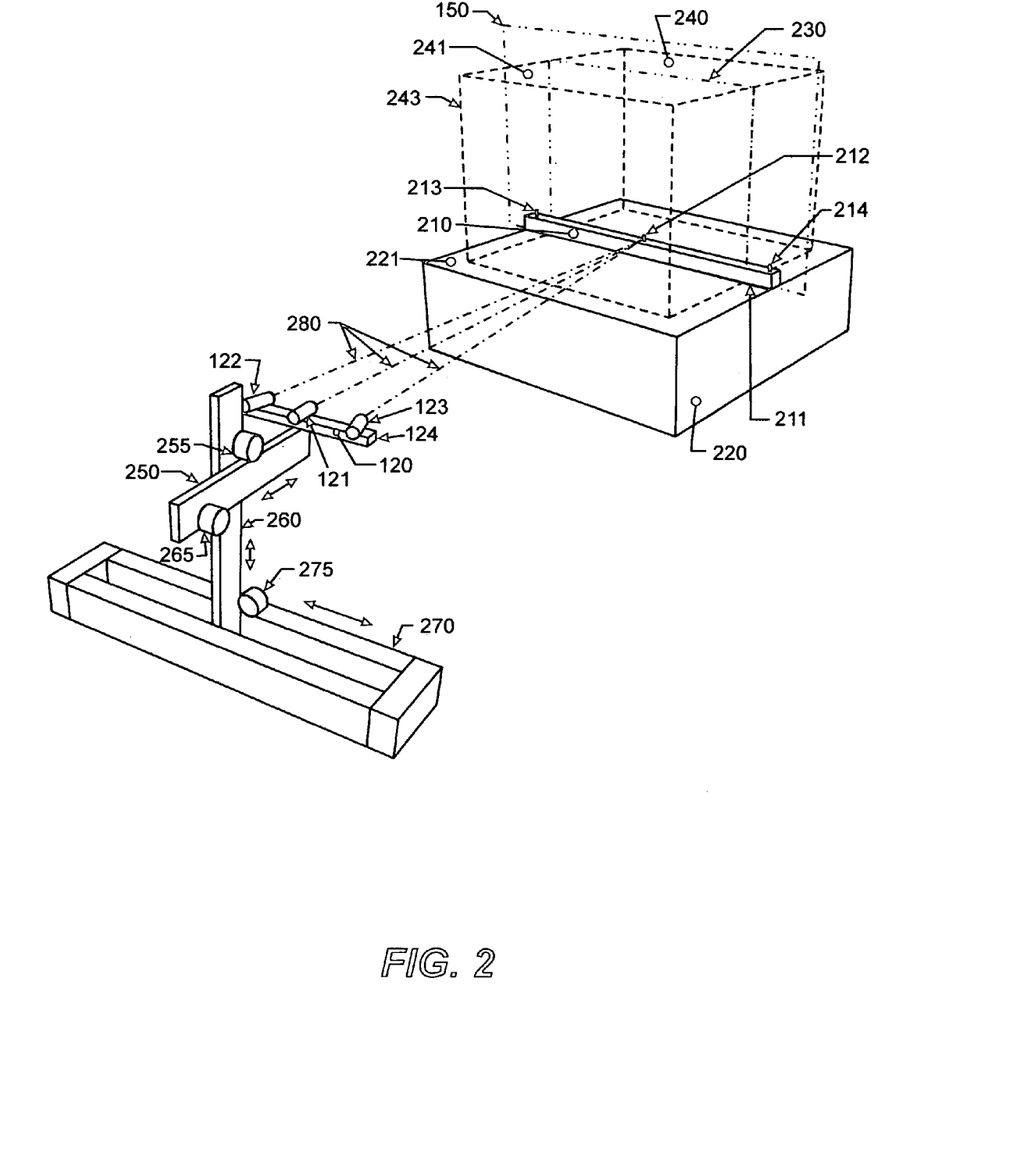
FIG. 2 illustrates the system components in accordance with one or more embodiments including a measurement module, 3-axis coordinate system, and a visualization of a virtual plane on a stand.

FIG. 2 illustrates a calibration device [210] placed on a stand [220], or platform, comprising a linear bar [211] placed on the stand [220] and a central pin [212], a left pin [213], and a right pin [214] that may be used to calibrate the laser device assembly [120] that includes the central laser measurement device (LMD) [121], a left outer LMD [122], a right outer LMD [123], and an LMD mounting support [124].

This calibration device [210] defines the virtual plane [150] used to determine the parting line [230] of the cavity portions [240, 241] of the selected packaging material [243] and the mating surface for which each portion of the cavity will be created.

Each LMD contains an electronic reading device, e.g., a beam sensor, for detecting a change in the integrity of the beam [280] when the beam [280] is emitted and when the beam is deflected (reflected) off a pin [212, 213, 214] or an object [140].

The LMD mounting support [124] is mounted on the Z-axis positioning member [250] of the three coordinate axis system [130] and is moved longitudinally in the +/−Z-axis direction by a z-axis motor [255]. The Z-axis positioning member [250] is mounted on the Y-axis positioning member [260], which is driven longitudinally by the Y-axis motor [265]. The Y-axis positioning member [260] is mounted on the X-axis positioning member [270] which is driven longitudinally by the X-axis motor [275]. The Z-axis motor [255], the Y-axis motor [265], and the X-axis motor [275] may be any motor capable of moving the Z-axis positioning member, the Y-axis positioning member, and the X-axis positioning member respectively, e.g. a stepper motor or a servo motor.

Figure 3:
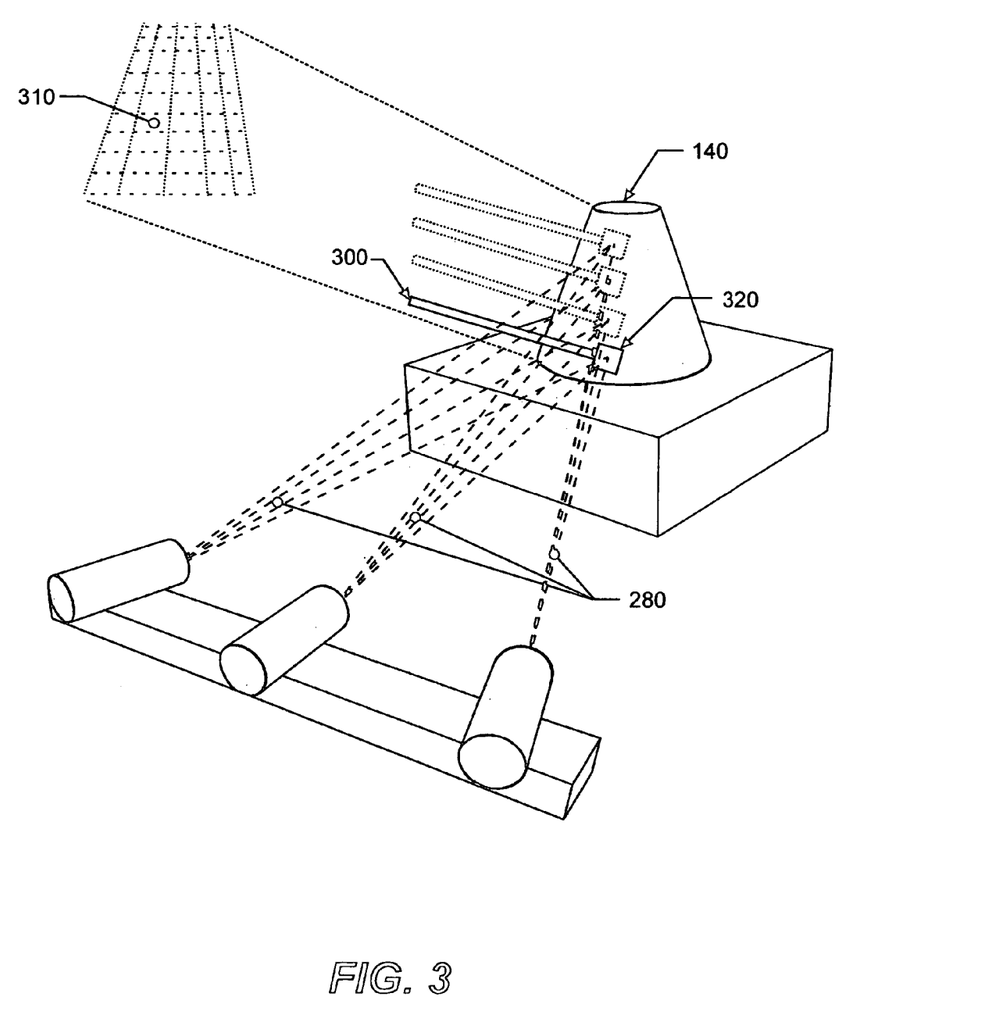
FIG. 3 illustrates use of a wand in creating a virtual cloud of points near the object being measured in accordance with one or more embodiments of the present invention.

FIG. 3 includes a wand [300] which is held in proximity of the object [140] to create a virtual surface on which to create a point cloud [310] by the beams [280] onto the wand face [320]. The generation of a plurality of points in space is commonly referred to as a point cloud [310].

Figure 4:
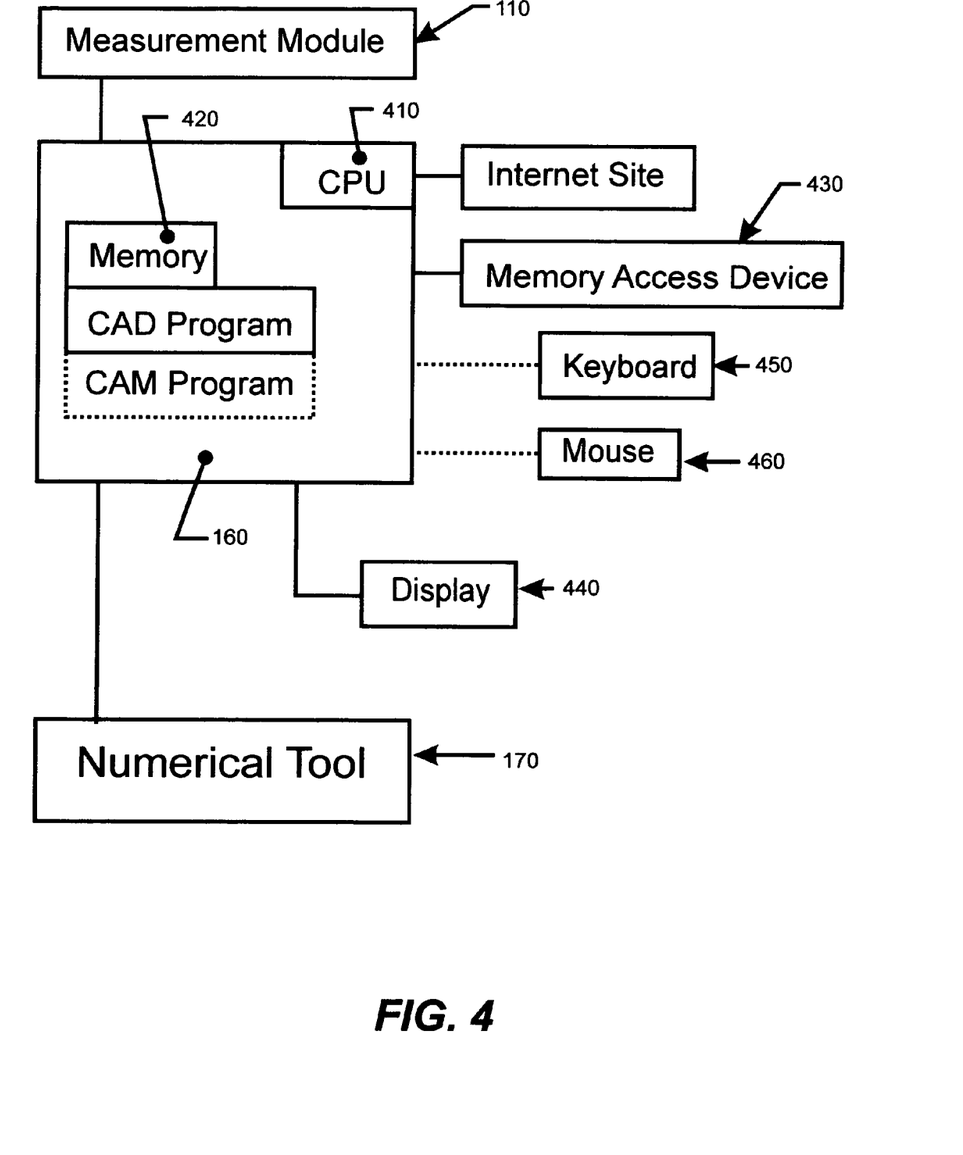
FIG. 4 is a block diagram of a system in accordance with one or more embodiments of the present invention illustrating a computer system, a measurement module, and a numerical tool machine.

FIG. 4 is a block diagram of a system in accordance with one or more embodiments of the present invention. Computer system [160] includes a central processing unit (CPU) [410] that is connected to a memory device [420]. A memory access device [430], such as a disk drive or a networking card, allows the programmed instructions to be transferred to memory [420] and to or from an external medium, a display [440] a keyboard [450] and a mouse [460]. The method of data transfer may be wired or wireless.

The computer system [160] uses the CPU [410] and memory [420] to generate 3D point data by processing the measured data in response to the program instructions and inputs from a user. The memory access device [430] allows the program instructions and information to be transferred to memory [420] from an external medium, such as a disk drive or a networked computer and allows the measured data or the 3D point data from memory [420] or CPU [410] to be transferred to an external medium. In addition, the computer system [160] includes a visual display [440] that is connected to a CPU [410] that is used to display to the user images necessary for interaction with the program. Thus, the user can conduct any necessary modifications to the image to ensure a proper cavity will be developed and eventually cut.

The computer system [160] also includes computer aided design (CAD) software program, such as SolidWorks®, TurboCAD® or others that are readily available for purchase on the market today, that allows for manipulation of a plurality of points of light referred to as point cloud [310] data into 3-dimensional (3-D) renditions from the 2-dimensional form initially displayed [440].

Gaps, voids, and/or shadows are then identifiable on the display [440] and the user may elect to re-scan the object [140] in a selected area. To do so, the wand [300] may be held in proximity of the object [140] and used to create a point cloud [310] of a virtual surface where a surface was not detected previously. The additional point cloud [310] generated by scanning the wand [300] is then merged into a CAD program to create a 3-D wireframe rendition of the object [140].

Detection of gaps, voids, and/or shadows presently require one skilled in the art of CAD to manually create the topography of the object [140] or algorithms involving weighted averages to attempt to determine the topography, whereas the use of the wand [300] allows the user to quickly create a representative topography of the object [140] without necessity of additional skilled personnel and expense.

In one embodiment, the wand [300] is a non-contact device comprised of a linear handle and an opaque surface [320] attached to an end providing a surface off of which the beams [280] reflect thereby creating a point of light or a plurality of points in a selected area to form a point cloud [310].

The computer system [160] may also include a computer aided manufacturing (CAM) software program, such as MasterCam®, that allows for manipulation of the point cloud [310] and 3-D wireframe rendition into tool paths for machining the cavities in the packaging material [240, 241, 243].

It is not necessary for the on-site user to have the CAM software installed on their computer because in one or more embodiments of the present invention, it is desirable to have the packaging material [240, 241, 243] machined at a remote site by a numerical tooling [170].

Numerical tooling [170] may be further defined as any device that is used in manufacturing a component. For example, the device may have motors that are computer controlled to create tool paths using a user defined cutting file.

The measurement system [100] and three-coordinate axis system [130] is physically set up in a user's area in proximity of the object [140] to be measured.

A calibration bar [210] is placed on a stand [220] at the user's site to calibrate the measurement module [110] and laser measurement device (LMD) assembly [120] by roughly approximating a distance parallel to the X-axis positioning member [270] of the measurement system [100].

The center LMD [121], right LMD [122] and left LMD [123] are brought to an operational state by powering the laser. The three coordinate axis system [130] is manipulated with the computer system [160] to move the Z-axis motor [255], Y-axis motor [265], and X-axis motor [275] causing the laser measurement device assembly [120] to move until the central LMD [121] beam [280] is focused on the central pin [212] of the calibration bar [210].

The right LMD [122] and left LMD [123] are angularly rotated toward the central LMD [121] until the beams [280] from the LMDs being calibrated converge to create a focal point on the central pin [212] of the calibration bar [210].

Full focus is determined by the user and depends primarily on the shape of the masked or filtered laser beams. A round or "dot" pattern is possible, as are other geometries, such as a cross, diamond, or alphabetic letter arrangement. During this operation the right LMD [122] or the left LMD [123] may be calibrated in any order. The sequence is then repeated for the remaining LMD.

Once the beams [280] from the central LMD [121], right LMD [122], and left LMD [123] are uniformly focused, the user then manipulates the computer system [160] to command the X-axis motor [275] to move the laser measurement device assembly [120] laterally along the X-axis positioning member [270] until the beams [280] from the central LMD [121], right LMD [122], and left LMD [123] are approximately focused on either the right pin [213] or left pin [214].

The calibration bar [210] is then rotated around an imaginary axis of the central pin [212] until the beams [280] are focused on the right pin [213] or left pin [214].

When the beams [280] are focused on the right pin [213] or left pin [214] and the central pin [212] using only the X-axis motor [275] to move the laser measurement device assembly [120] laterally along the X-axis positioning member [270], the measurement module [110] is considered calibrated and the base of the virtual plane [150] is defined.

The laser measurement assembly [120] requires the use of the central LMD [121], right LMD [122], and left LMD [123] in that whenever an object [140] has a curved surface or variations in topography, the right LMD [122] beam [280] or left LMD [123] beam [280] is obstructed from defining a point on the object [140] with the central LMD [121] beam [280]. However, the opposite LMD provides at least a second beam [280] for measurement.

This calibration also defines the base of the virtual plane [150] on which the object [140] is placed by the user. The virtual plane [150] may also be denoted on the stand [220] by use of tape, chalk, pencil or other visual means of marking, i.e., a calibration marker, to identify the base of the virtual plane [150] where the object [140] may be placed. The object [140] is then placed in alignment with the marking for the virtual plane [150] in a position defined by the user.

The computer system [160] is manipulated by the user to start the measurement process by activating the central LMD [121], right LMD [122], and left LMD [123] within the measurement program. The X-axis motor [275], Y-axis motor [265] and Z-axis motor [255] used to move the position of the laser measurement device assembly [120] beams [280] on the object [140] in order to scan the object [140]. One of the user-defined variables is an indication of the start and finish of the desired scan area outside or within the boundaries of object [140].

The computer system [160] programming allows the user to control the operation of the central LMD [121] right LMD [122], and left LMD [123]. The beam [280] is emitted to the object [140] and a receiver in the emitting LMD measures, along with other values, the intensity of the reflected beam [290]. When the emitting LMD [121, 122, 123] measures different points that lie on an object [140], a detectable change in beam [280] intensity results in the reflected beam [290]. The measured data includes location information, typically given as (x, y, z) coordinates in the computer system [160] internal coordinate system, and change in the beam [280] integrity (i.e. degradation or distortion).

The emitted beam [280] is of known intensity and, therefore, the change in the intensity of reflected beam [290] can be calculated.

Each location of the object [140] that is measured is considered a point of measurement.

Each point is identified in terms of x, y, and z coordinates and stored in the computer system [160] as such. This plurality of points is commonly referred to as a point cloud [310]. The object [140] is rotated 180 degrees on the stand [220] which allows scanning of the topography of the object [140]. This topography can be used in the creation of an enclosing, mating cavity.

The user may view information on the display [440] in order to determine whether there are any gaps, voids, or shadows in the point cloud [310]. Then, the user uses the wand [300] to create a point cloud [310] defining a virtual surface where any gaps, voids, or shadows exist. The presence of gaps, voids, and shadows presently require one skilled in the art of CAD to manually create missing topography of the object [140] or utilize algorithms involving weighted averages to attempt to determine the missing topography, whereas the use of the wand [300] allows the user to quickly create a representative topography of the object [140] without the necessity of additional skilled personnel and expense. The additional point cloud [310] generated by scanning the wand [300] is then merged with the CAD program to create a 3-D wireframe rendition of the object [140].

In instances where the user defines that the object [140] is not to be directly scanned by the beams [280], for example, due to concern about the beams [280] causing degradation of the object [140], the wand [300] may be held in proximity to the object [140], and used to create a virtual surface of the entire object [140], while the object [140] is protected from the beam [280] by the wand [300]. The virtual surface comprises a plurality of points, as a point cloud [310], that simulates the topography of the object [140]. The point cloud [310] data is stored to a memory access device [430], such as a disk drive, a networking card, or CD or the like, or stored to a user defined site for retrieval by the machining vendor for manipulation into cutting files for a numerical tool [170] to create cavity portions of the selected packaging materials [240, 241, 243] in the shape of the object [140]. Thus, the object [140] can be scanned quickly, efficiently, and without any contact.

What is claimed is:

1. A system for creation of a custom packaging cavity for a three-dimensional object comprising:
   a laser measurement device comprising:
      a laser for emitting beams of light towards the three-dimensional object; and
      an electronic reading device capable of detecting beams of light reflected away from the three-dimensional object;
   a wand capable of being positioned between the three-dimensional object and the laser measurement device such that emitted beams of light reflect off of the wand instead of the three-dimensional object; and
   a computer system that receives data from the electronic reading device representing detected reflected beams of light, wherein the computer system creates three-dimensional a virtual topography of the three-dimensional object from the received data, and wherein the created virtual topography is used to direct a numerical tool to cut a cavity in packaging material in a shape of the three-dimensional object.

2. The system of claim 1, wherein a plurality of laser measurement devices are mounted on a three-coordinate axis system, and the three-coordinate axis system moves with respect to the three-dimensional object such that beams of light from at least two laser measurement devices detectably reflect from each point on a topography of the three-dimensional object facing the three-coordinate axis system.

3. The system of claim 2, wherein a plurality of points representing a topography of a first surface of the three-dimensional object and a plurality of points representing a topography of a second surface of the three-dimensional object are detected, wherein the first surface and second surface are mating surfaces and define a parting line between two portions of the packaging material in the shape of the three-dimensional object.

4. The system of claim 1, wherein the laser of the laser measurement device emits a wide dynamic range of beams of light.

5. The system of claim 1, wherein the electronic reading device of the laser measurement device is capable of detecting an intensity of beams of light reflected away from the three-dimensional object.

6. The system of claim 2, at least three laser measurement devices are mounted on the three-coordinate axis system.

7. The system of claim 6, wherein at least one laser measurement device is mounted in a central position on the three-coordinate axis system, wherein the other laser measurement devices are co-axially offset from the centrally positioned laser measurement device, and wherein the offset laser measurement devices are angularly rotatable.

8. The system of claim 2, wherein the three-coordinate axis system comprises an X-axis positioning member, a Y-axis positioning member, and a Z-axis positioning member.

9. The system of claim 1, wherein the computer system is remote from electronic reading device, and data is communicated from a location of the electronic reading device to a location of the computer system.

10. The system of claim 9, wherein the data is communicated from the location of the electronic reading device to the location of the computer system via a network.

11. The system of claim 9, wherein the data is stored on a portable memory at the location of the electronic reading device and the computer system receives the data from the portable memory.

12. The system of claim 1, wherein the wand comprises a opaque surface.

13. The system of claim 1, wherein the beams of light emitted from the laser are filtered to provide a beam in a specific shape.

14. The system of claim 13, wherein the specific shape is one selected from the group consisting of a round, a cross, a diamond, an alphabetical letter, an alphabetical letter arrangement, and a geometric shape.

15. The system of claim 1, wherein an initial reflected beam of light is detected by the electronic reading device is used by the computer system as a reference point data and data representing all other reflected beams of light detected is defined in relation to the reference point data.

16. The system of claim 15, wherein the initial beam of light detected is reflected from a calibration marker.

17. A system for creation of a custom packaging cavity for a three-dimensional object comprising:

a plurality of laser measurement devices mounted on a three-coordinate axis system, each laser measurement device comprising:

a laser for emitting beams of light towards the three-dimensional object; and an electronic reading device capable of detecting beams of light reflected away from the three-dimensional object;

a computer system that receives data from each electronic reading device representing detected reflected beams of light, wherein the three-coordinate axis system moves with respect to the three-dimensional object such that beams of light from at least two laser measurement devices detectably reflect from each point on a topography of the three-dimensional object facing the three-coordinate axis system;

wherein the computer system creates three-dimensional a virtual topography of the three-dimensional object from the received data, and wherein the created virtual topography is used to direct a numerical tool to cut a cavity in packaging material.

18. The system of claim 17, further comprising a wand capable of being positioned between the three-dimensional object and the laser measurement device such that emitted beams of light reflect off of the wand instead of the three-dimensional object.

19. The system of claim 17, wherein a plurality of points representing a topography of a first surface of the three-dimensional object and a plurality of points representing a topography of a second surface of the three-dimensional object are detected, wherein the first surface and second surface are mating surfaces and define a parting line between two portions of the packaging material in the shape of the three-dimensional object.

20. The system of claim 17, wherein the laser of the laser measurement device emits a wide dynamic range of beams of light.

21. The system of claim 17, wherein the electronic reading device of the laser measurement device is capable of detecting an intensity of beams of light reflected away from the three-dimensional object.

22. The system of claim 17, at least three laser measurement devices are mounted on the three-coordinate axis system.

23. The system of claim 22, wherein at least one laser measurement device is mounted in a central position on the three-coordinate axis system, wherein the other laser measurement devices are co-axially offset from the centrally positioned laser measurement device, and wherein the offset laser measurement devices are angularly rotatable.

24. The system of claim 17, wherein the three-coordinate axis system comprises an X-axis positioning member, a Y-axis positioning member, and a Z-axis positioning member.

25. The system of claim 17, wherein the computer system is remote from electronic reading device, and data is communicated from a location of the electronic reading device to a location of the computer system.

26. The system of claim 25, wherein the data is communicated from the location of the electronic reading device to the location of the computer system via a network.

27. The system of claim 25, wherein the data is stored on a portable memory at the location of the electronic reading device and the computer system receives the data from the portable memory.

28. The system of claim 18, wherein the wand comprises a opaque surface.

29. The system of claim 17, wherein the beams of light emitted from the laser are filtered to provide a beam in a specific shape.

30. The system of claim 29, wherein the specific shape is one selected from the group consisting of a round, a cross, a diamond, an alphabetical letter, an alphabetical letter arrangement, and a geometric shape.

31. The system of claim 17, wherein an initial reflected beam of light is detected by the electronic reading device is used by the computer system as a reference point data and data representing all other reflected beams of light detected is defined in relation to the reference point data.

32. The system of claim 31, wherein the initial beam of light detected is reflected from a calibration marker.

33. A method for creation of a custom packaging cavity for a three-dimensional object comprising:
  mounting a plurality of laser measurement devices on a three-coordinate axis system, each laser measurement device comprising:
    a laser for emitting beams of light towards the three-dimensional object; and
    an electronic reading device capable of detecting beams of light reflected away from the three-dimensional object;
  transmitting data representing detected reflected beams of light from each electronic reading device representing to a computer system,
  moving the three-coordinate axis system with respect to the three-dimensional object such that beams of light from at least two laser measurement devices detectably reflect from each point on a topography of the three-dimensional object facing the three-coordinate axis system;
  creating a three-dimensional a virtual topography of the three-dimensional object from the received data, and
  using the created virtual topography to direct a numerical tool to cut a cavity in packaging material.

34. The method of claim 33, further comprising positioning a wand between the three-dimensional object and the laser measurement device such that emitted beams of light reflect off of the wand instead of the three-dimensional object.

35. The method of claim 33, further comprising:
  detecting a plurality of points representing a topography of a first surface of the three-dimensional object and a plurality of points representing a topography of a second surface of the three-dimensional object,
  wherein the first surface and second surface are mating surfaces and define a parting line between two portions of the packaging material in the shape of the three-dimensional object.

36. The method of claim 33, wherein the laser of the laser measurement device emits a wide dynamic range of beams of light.

37. The method of claim 33, wherein the electronic reading device of the laser measurement device is capable of detecting an intensity of beams of light reflected away from the three-dimensional object.

38. The method of claim 33, further comprising mounting at least three laser measurement devices on the three-coordinate axis system.

39. The method of claim 38, further comprising mounting at least one laser measurement device in a central position on the three-coordinate axis system, and
  mounting the other laser measurement devices co-axially offset from the centrally positioned laser measurement device, and
  wherein the offset laser measurement devices are angularly rotatable.

40. The method of claim 33, wherein the three-coordinate axis system comprises an X-axis positioning member, a Y-axis positioning member, and a Z-axis positioning member.

41. The method of claim 33, wherein the computer system is remote from electronic reading device, the method further comprising:
  communicating data from a location of the electronic reading device to a location of the computer system.

42. The method of claim 41, further comprising communicating the data from the location of the electronic reading device to the location of the computer system via a network.

43. The method of claim 41, further comprising storing the data on a portable memory at the location of the electronic reading device and transmitting the data from the portable memory to the computer system.

44. The method of claim 34, wherein the wand comprises a opaque surface.

45. The method of claim 33, further comprising filtering the beams of light emitted from the laser to provide a beam in a specific shape.

46. The method of claim 45, wherein the specific shape is one selected from the group consisting of a round, a cross, a diamond, an alphabetical letter, an alphabetical letter arrangement, and a geometric shape.

47. The method of claim 33, further comprising detecting an initial reflected beam of light that is used by the computer system as a reference point data, and
  defining data representing all other detected reflected beams of light in relation to the reference point data.

48. The method of claim 47, further comprising providing a calibration marker, wherein the initial beam of light detected is reflected from the calibration marker.

* * * * *